US009069771B2

(12) United States Patent
Shustef

(10) Patent No.: US 9,069,771 B2
(45) Date of Patent: Jun. 30, 2015

(54) MUSIC RECOGNITION METHOD AND SYSTEM BASED ON SOCIALIZED MUSIC SERVER

(75) Inventor: Yevgeniy Shustef, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 673 days.

(21) Appl. No.: 12/633,471

(22) Filed: Dec. 8, 2009

(65) Prior Publication Data

US 2011/0137855 A1 Jun. 9, 2011

(51) Int. Cl.
G06F 17/30 (2006.01)
G06F 7/00 (2006.01)
G06F 17/00 (2006.01)

(52) U.S. Cl.
CPC .... *G06F 17/30026* (2013.01); *G06F 17/30743* (2013.01); *G06F 17/30749* (2013.01); *G06F 17/30758* (2013.01)

(58) Field of Classification Search
CPC .......... G06F 17/30743; G06F 17/3074; G11B 27/28
USPC ............ 707/769, 772, 609, 999.001–999.005
See application file for complete search history.

(56) References Cited

U.S. PATENT DOCUMENTS

| | | | |
|---|---|---|---|
| 6,351,442 B1 | 2/2002 | Tagawa et al. | 369/53.41 |
| 6,385,596 B1 | 5/2002 | Wiser et al. | 705/51 |
| 6,407,750 B1 | 6/2002 | Gioscia et al. | 345/716 |
| 6,515,212 B2 | 2/2003 | Taira et al. | 84/609 |
| 6,604,072 B2 * | 8/2003 | Pitman et al. | 704/231 |
| 6,691,149 B1 | 2/2004 | Yokota et al. | 709/201 |
| 6,941,275 B1 | 9/2005 | Swierczek | 705/26 |
| 8,364,776 B1 * | 1/2013 | Conrad | 709/216 |
| 2002/0198789 A1 * | 12/2002 | Waldman | 705/26 |
| 2003/0028796 A1 * | 2/2003 | Roberts et al. | 713/193 |
| 2003/0089218 A1 * | 5/2003 | Gang et al. | 84/615 |
| 2003/0231868 A1 * | 12/2003 | Herley | 386/69 |
| 2004/0019658 A1 * | 1/2004 | Plastina et al. | 709/217 |
| 2004/0034441 A1 * | 2/2004 | Eaton et al. | 700/94 |
| 2004/0260682 A1 * | 12/2004 | Herley et al. | 707/3 |

(Continued)

OTHER PUBLICATIONS

J. Kincaid; TuneUp Brings Order to Your iTunes Library (For a Fee); TechCrunch, May 12, 2008 www.techcrunch.com/2008/05/12
Tunatic; www.magnesiummedia.com/pcutilities/details25781.html
Shazam for Windows Mobile; Mobile Marketing Magazine, Apr. 11, 2006; www.mobilemarketingmagazine.co.uk/2006/04.

*Primary Examiner* — Kannan Shanmugasundram
(74) *Attorney, Agent, or Firm* — Kermit D. Lopez; Luis M. Ortiz; Kevin Soules

(57) ABSTRACT

A music recognition method and system for retrieving metadata based on content associated with a media file. The system includes a music recognition plug-in module associated with a music management unit that communicates with a centralized music repository. The unknown media file may be scanned for collecting a snippet and sent to the music repository in response to a user request for identifying metadata associated with the unknown media file. The music management unit responds to the user with a matching set of standardized metadata, one or more potentially matching sets of data, or an indication that no match is made. The unidentified media file can be made available to the user via a Web interface associated with a socialized music server in order to populate the repository with the standardized metadata. A rating indicative of the user response to identify the metadata associated with the unknown media file can be provided in order to attract the user to contribute for the unknown media file identification.

18 Claims, 5 Drawing Sheets

(56) References Cited

U.S. PATENT DOCUMENTS

| | | | |
|---|---|---|---|
| 2005/0141707 A1* | 6/2005 | Haitsma et al. | 380/201 |
| 2005/0227674 A1* | 10/2005 | Kopra et al. | 455/414.1 |
| 2006/0149533 A1* | 7/2006 | Bogdanov | 704/205 |
| 2006/0217828 A1* | 9/2006 | Hicken | 700/94 |
| 2007/0162761 A1* | 7/2007 | Davis et al. | 713/182 |
| 2007/0177606 A1 | 8/2007 | Jabri et al. | 370/395.5 |
| 2007/0177616 A1 | 8/2007 | Jabri et al. | 370/401 |
| 2007/0180135 A1 | 8/2007 | Kenrick et al. | 709/231 |
| 2007/0260601 A1* | 11/2007 | Thompson et al. | 707/5 |
| 2008/0082510 A1* | 4/2008 | Wang et al. | 707/3 |
| 2009/0094113 A1* | 4/2009 | Berry et al. | 705/14 |

* cited by examiner

MUSIC RECOGNITION METHOD AND SYSTEM BASED ON SOCIALIZED MUSIC SERVER

TECHNICAL FIELD

Embodiments are generally related to data management systems and methods. Embodiments also relate in general to the field of computers and similar technologies and, in particular, to software utilized in this field. In addition, embodiments relate to the retrieval of metadata associated with media content.

BACKGROUND OF THE INVENTION

Many computing devices such as, for example, personal computers, desktop computers, and various handheld computing devices include software that permits various types of media (e.g., audio, video, etc) to be played on the device. Such media-playing software typically plays or renders digital media in the form of audio and video data. Such computing devices may download a variety of musical composition files via music collection software (e.g., iTunes) and store such data on a hard disk integrated with the device. The music collection software organizes digital media file such as, for example, audio music tracks, in accordance with metadata or other digital properties data associated with the media files.

Metadata generally includes information pertaining to the media file and is usually stored within a file. For example, a particular audio file may include metadata such as, for example, a song title, artist name, date of release, genre, a thumbnail graphic, and so forth. The media file acquired from the music collection software may be automatically integrated with specified metadata types. Some media files acquired from remote sites via the Internet, however, lack metadata or may include metadata that is inconsistent or incomplete. As a result, large collections become difficult if not impossible to use because a user is forced to listen to the track to determine the metadata, and in most cases, are unable to identify the track of interest. Therefore, a need is required for obtaining relevant metadata for such media files.

In some existing systems, a user may request updated metadata for the media file by sending, via a media player, the incomplete metadata to a system capable of accessing additional metadata. Such systems, however, often fail to identify the correct media content associated with the received metadata due to the incompleteness or insufficiency of the received metadata. As such, existing systems are unable to return relevant metadata or provide correct metadata to the user, especially when dealing with large collections of music and related data.

Based on the foregoing, it is believed that a need exists for an improved music recognition method and system for retrieving metadata based on the content of a media file. A need also exists for a socialized music server that is capable of identifying musical content, as described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by reviewing the entire specification, claims, drawings, and abstract as a whole.

It is, therefore, one aspect of the disclosed embodiments to provide for an improved music collection management method and system.

It is another aspect of the disclosed embodiments to provide for an improved music recognition method and system for retrieving metadata based on content associated with media files.

It is a further aspect of the disclosed embodiments to provide for a socialized music server that identifies musical content.

The aforementioned aspects and other objectives and advantages can now be achieved as described herein. A music recognition method and system based on a socialized music server is disclosed herein. A music recognition plug-in module is associated with a music management unit that communicates with a centralized music repository, wherein metadata can be retrieved based on content associated with one or more media files (e.g., music tracks, audio data, video clips, snippets of music, etc). An unknown media file may be scanned so that a snippet of data can be collected from the unknown media file and transmitted to the music repository, in response to a user request for identifying metadata associated with the unknown media file. The music management unit responds by generating a matching set of metadata, one or more potentially matching sets of data, or an indication that no match has been identified. The unidentified media file can be made available to a user via a Web interface associated with the music server in order to populate the repository with the metadata. The music server provides data communications between the repository and the Web interface.

A rating indicative of the user response to identify the metadata associated with the unknown media file can be promulgated in order to entice a user to contributing the unknown media file for identification. The metadata associated with the unknown media file may be retrieved by matching the content of the unknown media file with a known media file.

The music recognition plug-in module may be invoked to process the unknown media file. The centralized repository can be configured to include a rich collection of indexed music tracks and metadata associated with each track and may be configured with an existing database. The socialized music server permits a user (i.e., including crowd-source approaches) to access an unknown media file in the centralized repository to assist in identifying the musical content. Such a music recognition system thus identifies a music track by analyzing the content associated with the music track.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

Figure 1:
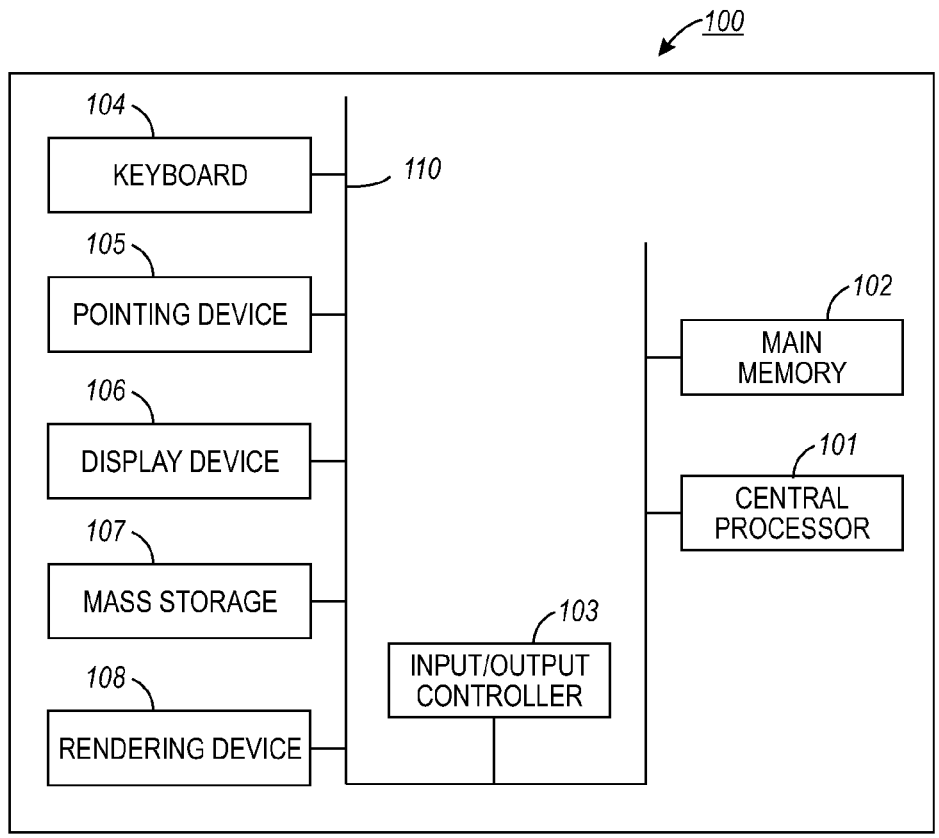
FIG. 1 illustrates a schematic view of a data-processing system in which an embodiment may be implemented.
Figure 2:
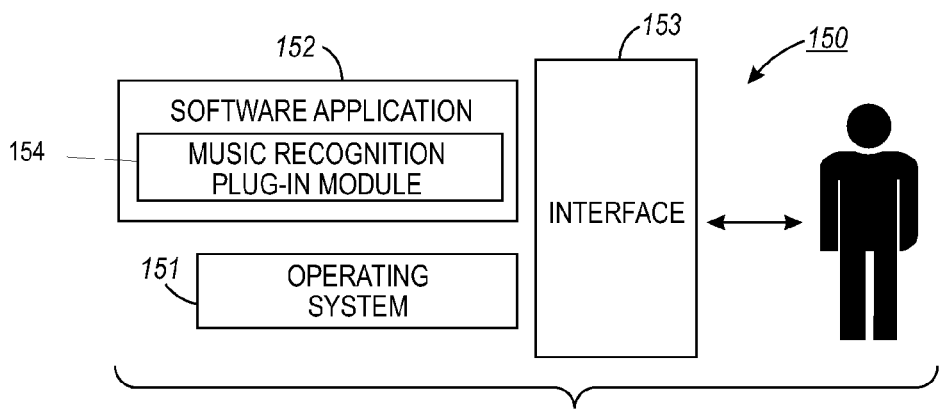
FIG. 2 illustrates a schematic view of a software system including an operating system, application software, and a user interface for carrying out an embodiment.
Figure 3:
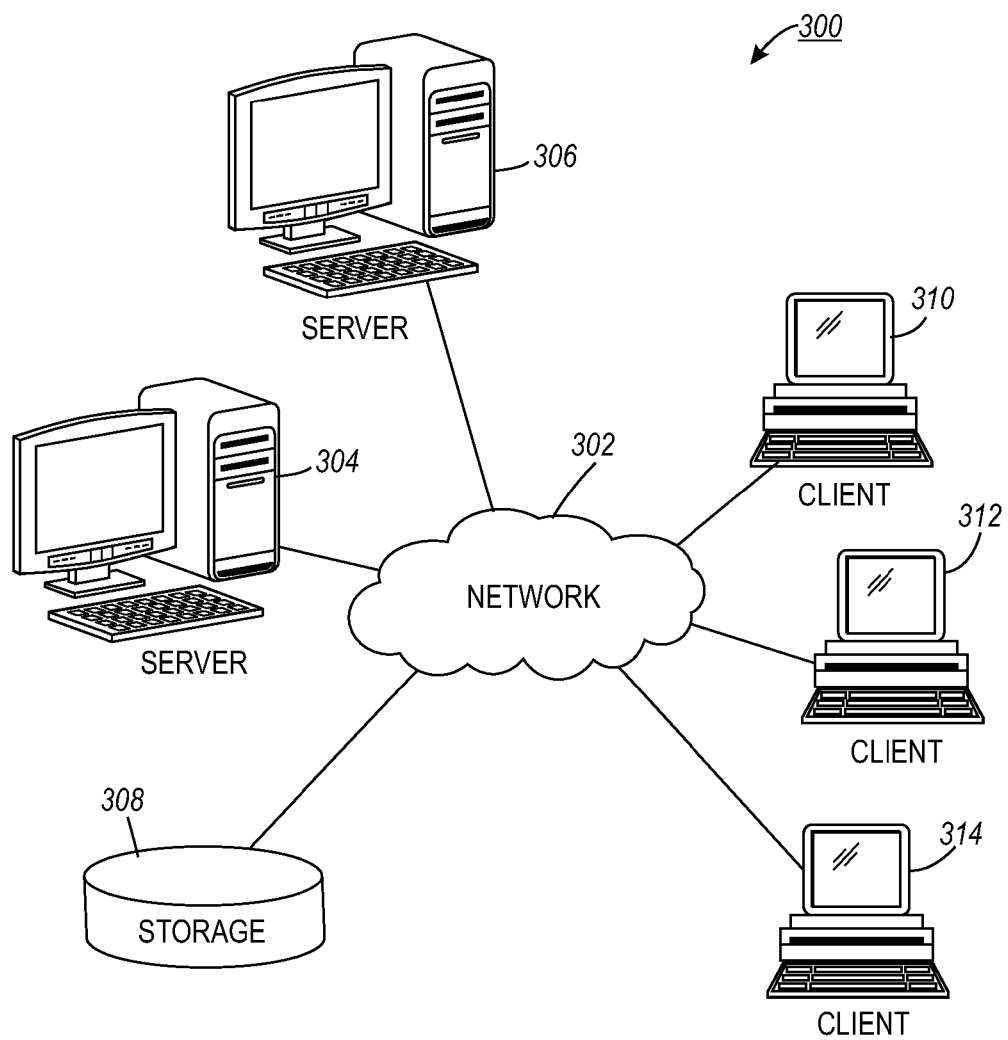
FIG. 3 illustrates a graphical representation of a network of data processing systems in which aspects of the disclosed embodiments may be implemented.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the present invention.

As illustrated in FIG. 1, the disclosed embodiments may be implemented in the context of a data-processing system 100 comprising, for example, a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108 (e.g., printer, scanner, fax machine, etc), for example, may be associated with the data-processing system 100 as desired. As illustrated, the various components of data-processing system 100 communicate electronically through a system bus 110 or similar architecture. The system bus 110 may be a subsystem that transfers data between, for example, computer components within data-processing system 100 or to and from other data-processing devices, components, computers, etc. The input/output controller 103 can be, in some embodiments, for example, a computer chip or extension card that interfaces with a peripheral device. This may be a link between two parts of a data-processing system 100 (for example a memory controller that manages access to memory for the data-processing system 100) or a controller on an external device that manages the operation of (and connection with) that device.

FIG. 2 illustrates a computer software system 150 for directing the operation of the data-processing system 100 depicted in FIG. 1. Software application 152, stored in main memory 102 and on mass storage 107, generally includes a kernel or operating system 151 and a shell or interface 153. One or more application programs, such as software application 152, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating module 151 and/or software application 152.

The following discussion is intended to provide a brief, general description of suitable computing environments in which the method and system may be implemented. Although not required, the disclosed embodiments will be described in the general context of computer-executable instructions, such as program modules, being executed by a single computer.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task, such as word processing, accounting, inventory management, etc. Such a module may also constitute a software application such as a "plug-in". Note that the term plug-in as utilized herein refers generally to a computer program that interacts with a host application (e.g., a Web browser) to provide a certain, usually very specific, function "on demand". The terms "plug-in" and "plug-in module" and "module" may be utilized interchangeably to refer to the same component or application.

The interface 153, which is preferably a graphical user interface (GUI), can serve to display results, whereupon a user may supply additional inputs or terminate a particular session. In some embodiments, operating system 151 and interface 153 can be implemented in the context of a "Windows" system. It can be appreciated, of course, that other types of systems are possible. For example, rather than a traditional "Windows" system, other operation systems such as, for example, Linux may also be employed with respect to operating system 151 and interface 153. The software application 152 can include a music recognition plug-in module 154 that can be adapted for retrieving metadata based on actual content associated with a media file. Module 154 can be adapted for populating a music repository with standardized metadata based on crowd sourcing approach. Software application module 152, on the other hand, can include instructions such as the various operations described herein with respect to the various components and modules described herein such as, for example, the method 500 depicted in FIG. 5.

FIG. 3 illustrates a graphical representation of a network of data-processing systems in which aspects of the disclosed embodiments may be implemented. Network data-processing system 300 is a network of computers in which embodiments of the present invention may be implemented. Network data-processing system 300 contains network 302, which is the medium used to provide communications links between various devices and computers connected together within network data-processing apparatus 100. Network 302 may include connections such as wire, wireless communication links, or fiber optic cables.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing system 100 depicted in FIG. 1 can be, for example, a client such as client 310, 312, and/or 314. Alternatively, data-processing system 100 can be implemented as a server such as servers 304 and/or 306, depending upon design considerations.

In the depicted example, server 304 provides data such as boot files, operating system images, and applications to clients 310, 312, and 314. Clients 310, 312, and 314 are clients to server 304 in this example. Network data-processing system 300 may include additional servers, clients, and other devices not shown. Specifically, clients may connect to any member of a network of servers which provide equivalent content.

In the depicted example, network data-processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data processing system 300 also may be implemented as a number of different types of networks such as for example, an intranet, a local area network (LAN), or a wide area network (WAN). FIG. 1 is intended as an example and not as an architectural limitation for varying embodiments of the present invention.

The description herein is presented with respect to particular embodiments of the present invention, which may be embodied in the context of a data-processing system such as, for example, data-processing system 100 and computer software system 150 illustrated with respect to FIGS. 1-3. Such embodiments, however, are not limited to any particular application or any particular computing or data-processing environment. Instead, those skilled in the art will appreciate that the disclosed method and system may be advantageously applied to a variety of system and application software. Moreover, the present invention may be embodied on a variety of different computing platforms, including Macintosh, UNIX, LINUX, and the like.

Figure 4:
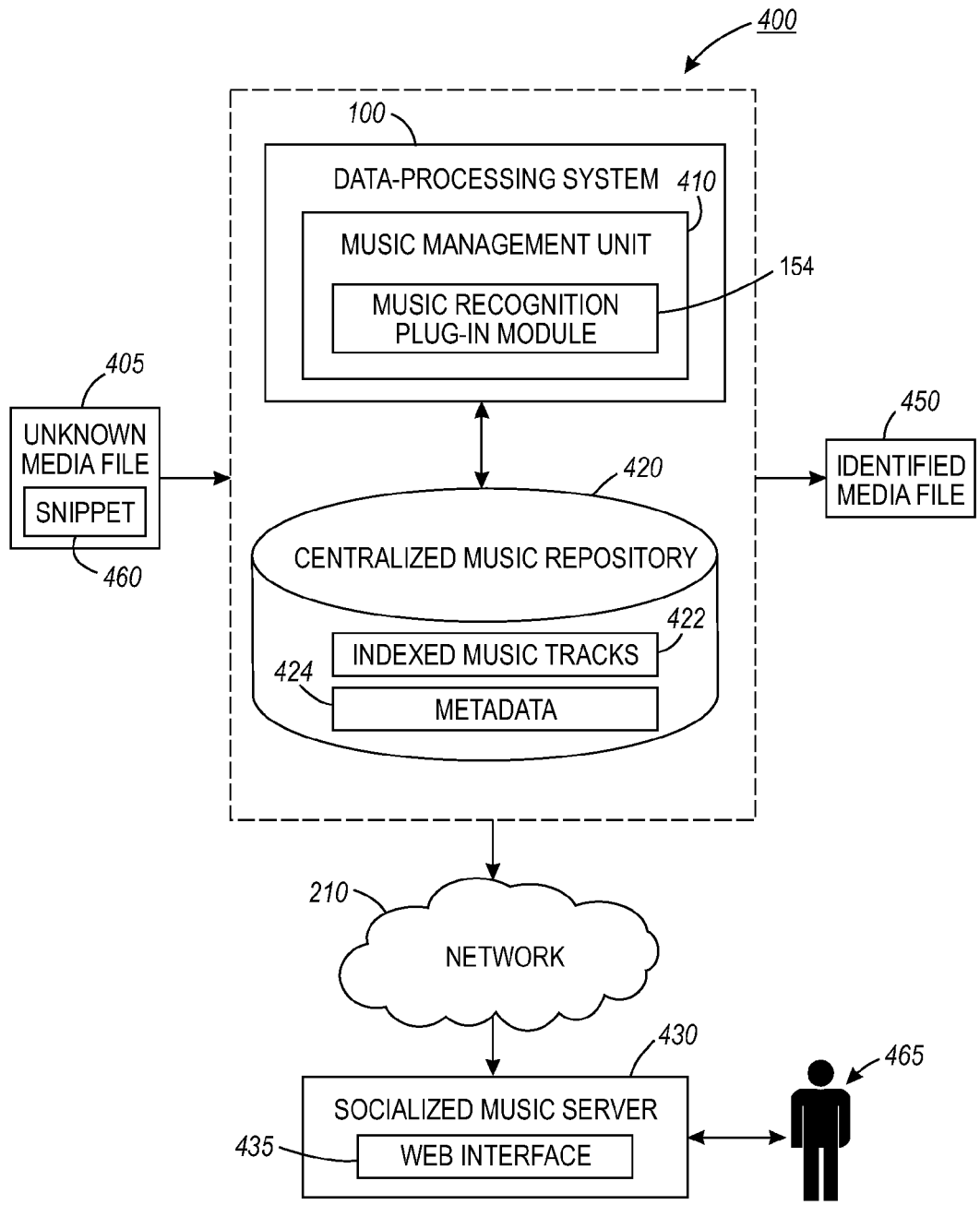
FIG. 4 illustrates a block diagram of a music recognition system, in accordance with the disclosed embodiments.

FIG. 4 illustrates a block diagram of a music recognition system 400, in accordance with the disclosed embodiments. Note that in FIGS. 1-7, identical or similar blocks are generally indicated by identical reference numerals. The music recognition system 400 generally includes a music recognition plug-in module 152 associated with a music management unit 410 that communicates with a centralized music repository 420 for retrieving metadata based on actual content associated with a media file 405 (e.g., music track). The music management unit 410 may be loaded to, for example, data-processing system 100 depicted in FIG. 1. The music management unit 410 may be generally employed to manage (e.g. sort, catalogue, and so forth) the media file 405.

The media content associated with the digital media file 405 is described in the context of content embodied on a CD or a DVD. It may be appreciated and understood that the media content may be embodied on any suitable media, including digital files downloaded to memory accessible by the data-processing system 100. Note that the digital media file 405 generally refers to one or more files representing, for example, a single song track or a collection of tracks such as may be found on an audio CD. The media content 405 may include, without limitation, specially encoded media content in the form of an encoded media file. A music track is generally a data module containing binary data that encodes recorded music corresponding to a music title. The data can be read from the file and processed to produce an audio output exploitable by the data-processing system 100 or suitable sound reproduction system. Music tracks are generally handled and managed like other computer files and have arbitrarily chosen file names which serve to indicate the associated audio content, usually a music title and artist.

The music management system 400 may invoke the music recognition plug-in module 154 to process the unknown media file 405. The unknown media file 405 may be scanned for collecting a snippet 460 and sent to the music repository 420 in response to a request from a user for identifying metadata associated with the unknown media file 405. The music recognition plug-in module 154 identifies and retrieves metadata 424 associated with the unknown media file 405 from the music repository 420. Note that the term plug-in as utilized herein refers generally to a computer program or other module that interacts with a host application to provide a certain, usually very specific, function "on demand". The music recognition plug-in module 154 includes an API (Application Programming Interface) for communicating with the centralized music repository 420. The centralized music repository 420 generally includes indexed music track(s) 422 and metadata 424 associated with each music track. The repository 420 focuses on maintaining a vast collection of standardized metadata 424 with respect to the music track 422. The repository 420 delivers the metadata associated with the unknown media file 405 to the music management unit 410.

The music repository 420 is intended to mean not only traditional database structures, but more generally, collections of music tracks and metadata that may be configured in association with an existing database. The centralized music repository 420 can be located locally in association with the data-processing system 100. Additionally or alternatively, the music repository 420 or portions thereof can be located remotely. The music repository 420 may index music track(s) 422 comprising one or more pieces of music that can be played or rendered by the music management unit 410. The music management unit 410 responds to the user with a matching set of standardized metadata, one or more potentially matching sets of data, or an indication that no match is made with respect to the unknown music track 405. The identified media file 450 may be provided to the music management unit 410 and utilized to update the associated music track metadata 424.

Note that as utilized herein, the term "metadata" generally refers to "data about data", or of any sort of data contained in any media. An item of metadata may describe an individual datum, or content item, or a collection of data including multiple content items and hierarchical levels, for example, a database schema. In data processing, metadata is definitional data that provides information about or documentation of other data managed within an application or environment. For example, metadata would document data about data elements or attributes (name, size, data type, etc.), data about records or data structures (length, fields, columns, etc.), and data about data (where it is located, how it is associated, ownership, etc.). Metadata may include descriptive information about the context, quality, and condition, or characteristics of the data. Metadata can be thought of as data used to identify, describe, and locate resources.

In the context of the disclosed embodiments, metadata includes information related to specific content of the digital media file being played on a media player. Basic metadata includes a title, composer, performer, genre, a description of content, and the like. Extended metadata includes cover art, performer biographies, reviews, related performers, where to buy similar items, upcoming concerts, ticket sales, URLs to other related experiences including purchase opportunities, and the like. This information includes, but is not limited to, an artist name, an album title, a track name, a track number, and a track length. The metadata associated with the unknown music track 405 may be retrieved by matching the content of the unknown music track 405 with known music track.

The music recognition system 400 further includes a socialized music server 430 that includes a Web interface 435 that allows for data communication between the database 420 and the Web interface 435. Note that the socialized music server 430 is similar and analogous to the server 304 and server 306 depicted in FIG. 3. Note additionally that the term "Web" or "web" as utilized herein generally refers to the "World Wide Web," which is the well-known system of interlinked hypertext documents accessed via the Internet. With a web browser, for example, one can view Web pages that may contain text, images, videos, and other multimedia and navigate between them using hyperlinks.

The socialized music server 430 may be employed to populate the database 420 with standardized metadata 424 via a user 465. The socialized music server 430 permits the user 465 to access the unknown media file 405 in the centralized database 420 based on a crowdsourcing approach to help identify the musical content. Note that as utilized herein, the term "crowdsourcing" generally refers to an approach when an entity (such as a corporation) outsources a task to an undefined set of task performers, such as a large group of people over the Internet. The crowdsourcing approach leverages talents of willing people and facilitates communication with agents who might otherwise not be available for a task, or who might not otherwise be known.

The user 465 may be prompted with support tools to increase the effectiveness as the user 465 provides information with respect to the unknown media file 405. A rating can be provided for each correctly identified media file 450 so as to entice the user 465 to contribute to the identification process. The socialized music server 430 communicates with the centralized music repository 420 via a data communication network 210. The socialized music server 430 and the music management unit 410 are coupled to the data communication network 210. While the network 210 in this example is the Internet, the disclosed embodiments may be applied to any data communication network. The music recognition plug-in module 154 may also periodically check to determine if the music tracks that failed identification previously have been identified. Such information can also be updated in the centralized music repository 420 once the metadata becomes available.

Figure 5:
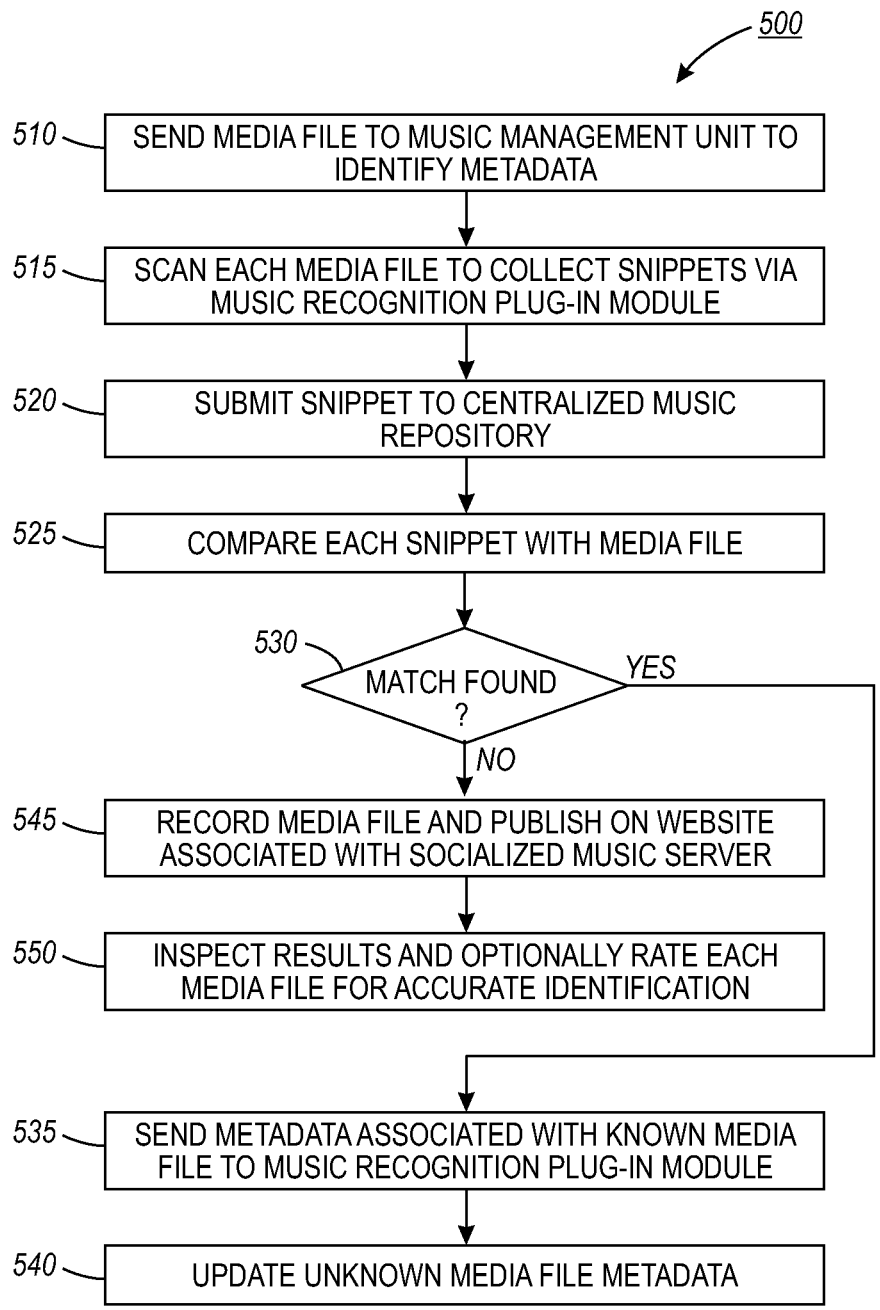
FIG. 5 illustrates a flow chart of operations illustrating logical operational steps of a method for retrieving metadata based on content associated with a media file, in accordance with the disclosed embodiments.

FIG. 5 illustrates a flow chart of operations illustrating logical operational steps of a method 500 for retrieving metadata based on content associated with the media file, in accordance with the disclosed embodiments. Note that the logical operations of method 500 may be implemented as instructions in the context of a module, such as those discussed herein. The method 500 can be implemented in the context of a computer-useable medium that contains a program product including, for example, a module or a group of modules. The unknown music track(s) 405 can be sent to the music management unit 410 for identifying metadata associated with the media file 405, as illustrated at block 510. Each media file may then be scanned to collect the snippet 460 (e.g., thirty seconds) via the music recognition plug-in module 154, as depicted at block 515.

As depicted at block 520, the data snippet(s) 460 can be presented to the centralized music repository 420. Thereafter, as illustrated at block 525, each snippet 460 of data can be compared with the music track 422 stored in the centralized repository 420. Next, as described at decision block 520, a determination can be made as to whether or not a match is found. If so, then the operations depicted at blocks 535 and 540 can be processed. As shown at block 545, an operation can be implemented to record the media file and publish on a website associated with the socialized music server. As depicted at block 550, an operation can be implemented to inspect the results and optionally rate each media file for accurate identification. As indicated at block 535, metadata associated with a known media file can be sent to the music recognition plug-in module. As illustrated at block 540, the unknown media file metadata is updated. Note that in some embodiments, if the snippet 460 matches with the music track 422 stored in the centralized repository 420, the metadata associated with the music track can be sent back to the music management unit 410. Following processing of the operation illustrated at block 535, the unknown track metadata can be updated, as indicated at block 540. Otherwise, the music track can be stored in the centralized music repository 410 and published on the website 435 associated with the socialized music server 430 for identifying the unknown media file 405, as illustrated at block 545. The results can be inspected and optionally rated for accurate music identifications, as depicted at block 550.

Figure 6:
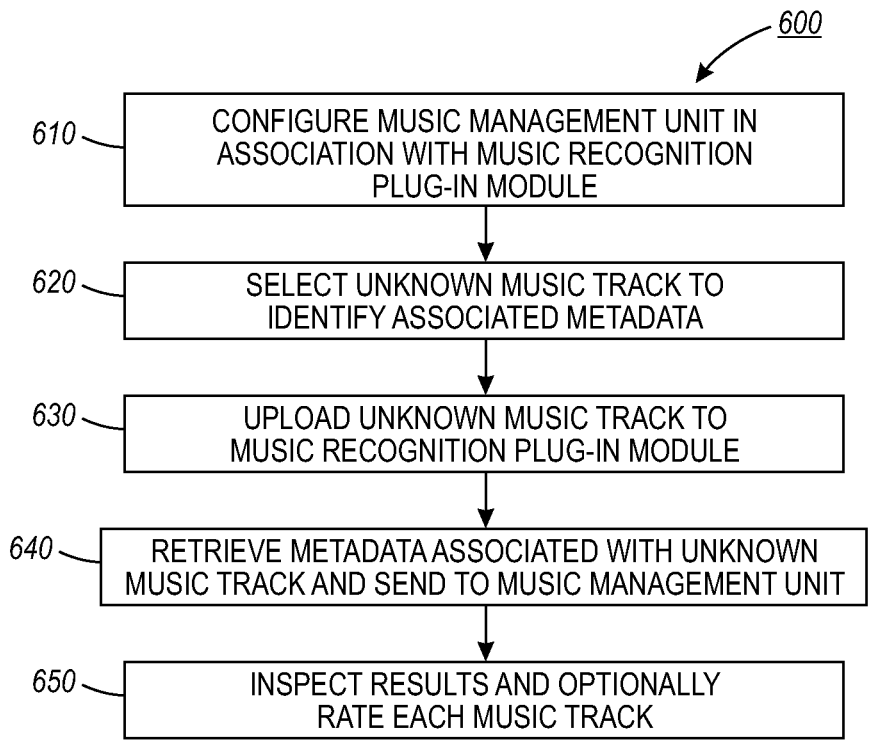
FIG. 6 illustrates a flow chart of operations illustrating logical operational steps of a method for requesting unknown media file identification, in accordance with the disclosed embodiments.

FIG. 6 illustrates a flow chart of operations illustrating logical operational steps of a method 600 for requesting unknown media file identification, in accordance with the disclosed embodiments. The method 600 can be deployed as process software in the context of a computer system or data-processing system as that depicted in FIGS. 1-3. The music management unit 410 can be configured in association with the music recognition plug-in module 154, as indicated at block 610. An unknown music track can then be selected to identify the associated metadata, as depicted at block 620. Thereafter, the unknown music track can be uploaded to the music recognition plug-in module 154, as depicted at block 630. The metadata associated with the unknown music track can be retrieved and sent to the music management unit 410, as illustrated at block 640. The results can then be inspected and the identified music tracks optionally rated, as depicted at block 650.

Figure 7:
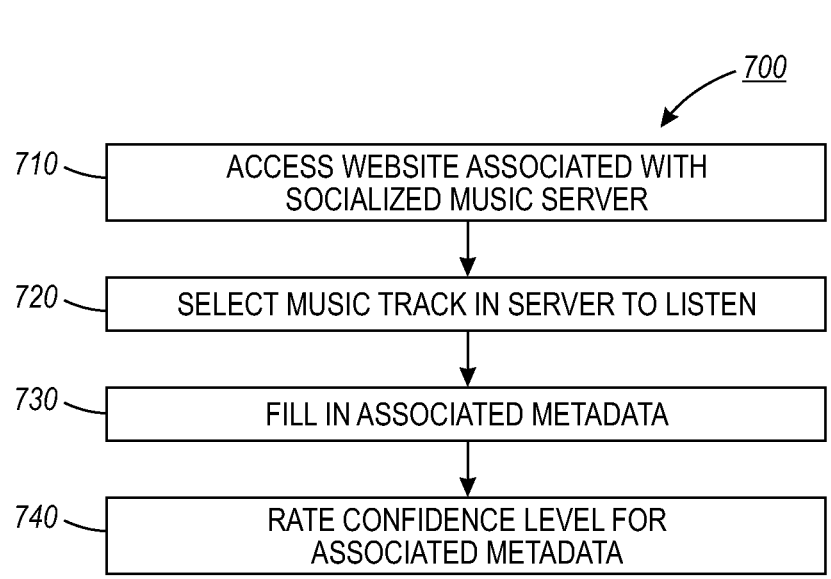
FIG. 7 illustrates a flow chart of operations illustrating logical operational steps of a method for populating a database with metadata, in accordance with the disclosed embodiments.

FIG. 7 illustrates a flow chart of operations illustrating logical operational steps of a method 700 for populating the database with standardized metadata, in accordance with the disclosed embodiments. The website 435 associated with the socialized music server 430 can be accessed, as illustrated at block 710. The unknown music track can be selected to listen, as depicted at block 720. Thereafter, the associated metadata that the user is aware of can be filled in, as depicted at block 730. The confidence level for the associated metadata can be rated, as illustrated at block 740. The rating can be provided based on the success rate to attract the users to access the website 435 to contribute to the identification effort. The music recognition system 400 disclosed herein can thus combine content based identification with social crowdsourcing for higher level of identification accuracy.

Based on the foregoing, it can be appreciated that an embodiment is disclosed herein involving a method that includes scanning an unknown media file to obtain a snippet from the unknown media file in response to a user request for identifying metadata associated with the unknown media file, by executing a program instruction in a data-processing system, transmitting the snippet to a repository in order to thereafter search the repository based on the snippet, by executing a program instruction in a data-processing system (e.g., data-processing system 100), and automatically retrieving a matching set of metadata with respect to a known media file stored in the repository if the snippet matches content associated with the known media file, by executing a program instruction in a data-processing system.

In another embodiment of such a method, the step of retrieving a matching set of metadata with respect to a known media file, by executing a program instruction in a data-processing system, can further comprise storing the unknown media file in the repository, if the snippet associated with the unknown media file does not match content associated with the known media file, by executing a program instruction in a data-processing system.

In yet a further embodiment of such a method, a web interface can be configured in association with a socialized music server, by executing a program instruction in a data-processing system. Additionally, the repository can be populated with the metadata with respect to the unknown media file via the web interface by the user, by executing a program instruction in a data-processing system. In other embodiments a rating can be provided, which is indicative of the user response to identify the metadata associated with the unknown media file in order to attract the user to contribute the unknown media file identification, by executing a program instruction in a data-processing system.

Additionally, in an alternative embodiment to such a method, an operation can processed for providing data communication between the repository and the web interface in order to populate the repository with the metadata, by executing a program instruction in a data-processing system. Also, in another embodiment of such a method, a music recognition plug-in module can be configured in association with the repository to process the unknown media file, by executing a program instruction in a data-processing system.

In still other embodiments, the aforementioned media file can be, for example, a music track. Additionally, the repository can include a plurality of indexed music tracks and metadata associated with each music track. Also, in some embodiments an operation can be processed for permitting the user to access the unknown media file stored in the repository to assist in identifying the metadata, by executing a program instruction in a data-processing system. Additionally, an operation can be processed in some embodiments for updating the unknown media file with the metadata from the repository, by executing a program instruction in a data-processing system.

It can be appreciated that in another embodiment, a system can be configured to include a processor, a data bus coupled to the processor, and a computer-usable medium embodying computer code, with the computer-usable medium being coupled to the data bus. In such a system, the computer program code can include: instructions executable by the processor and configured for scanning an unknown media file to obtain a snippet from the unknown media file in response to a user request for identifying metadata associated with the unknown media file; transmitting the snippet to a repository in order to thereafter search the repository based on the snippet; and automatically retrieving a matching set of metadata with respect to a known media file stored in the repository if the snippet matches content associated with the known media file.

In another embodiment of such a system, such instructions can be further configured for storing the unknown media file in the repository, if the snippet associated with the unknown media file does not match content associated with the known media file, by executing a program instruction in a data-processing system. Additionally, the instructions for retrieving a matching set of metadata with respect to a known media file can be further configured for storing the unknown media file in the repository, if the snippet associated with the unknown media file does not match content associated with the known media file.

In another embodiment of such a system, the aforementioned instructions can be further configured for configuring a music recognition plug-in module in association with the repository to process the unknown media file. In such a system, the media file can be, for example, a music track, or other appropriate data. The repository can be, for example, a plurality of indexed music tracks and metadata associated with each music track. In still another embodiment of such a system, the instructions can be further configured for permitting the user to access the unknown media file stored in the repository to assist in identifying the metadata and for updating the unknown media file with the metadata from the repository.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method, comprising:

scanning an unknown media file to obtain a thirty second snippet of said unknown media file in response to a user request for identifying metadata associated with said unknown media file, by executing a program instruction in a data-processing system;

transmitting said thirty second snippet to a repository in order to thereafter search said repository based on said thirty second snippet, by executing a program instruction in a data-processing system wherein said repository comprises a plurality of indexed music tracks and metadata associated with each music track wherein said metadata comprises basic metadata and extended metadata, said extended metadata comprising cover art, performer biographies, reviews, related performers, where to buy similar items, upcoming concerts, ticket sales, URLs to other related experiences, and purchase opportunities;

comparing said thirty second snippet with a known media file in said repository to determine if said thirty second snippet matches said known media file;

crowdsourcing said unknown media file to aid in identifying metadata associated with the unknown media file; and automatically retrieving a matching set of metadata with respect to a known media file stored in said repository if said thirty second snippet matches said known media file, by executing a program instruction in a data-processing system.

2. The method of claim 1 wherein retrieving a matching set of metadata with respect to a known media file, by executing a program instruction in a data-processing system, further comprises:

storing said unknown media file in said repository, if said snippet associated with said unknown media file does not match content associated with said known media file, by executing a program instruction in a data-processing system.

3. The method of claim 2 further comprising:

configuring a web interface in association with a socialized music server, by executing a program instruction in a data-processing system;

providing support tools associated with said web interface for increasing user effectiveness of providing information with respect to said unknown media file via said web interface; and populating said repository with said metadata with respect to said unknown media file via said web interface by said user, by executing a program instruction in a data-processing system.

4. The method of claim 3 further comprising providing a rating comprising a confidence level indicative of accurate music identifications provided by said user response to identify said metadata associated with said unknown media file in order to attract said user to contribute said unknown media file identification, by executing a program instruction in a data-processing system.

5. The method of claim 3 further comprising providing data communication between said repository and said web interface in order to populate said repository with said metadata, by executing a program instruction in a data-processing system.

6. The method of claim 1 further comprising configuring a music recognition plug-in module wherein said music recognition plug-in module interacts with a host application embodied as said repository to process said unknown media file, by executing a program instruction in a data-processing system.

7. The method of claim 1 wherein said media file comprises a video clip.

8. The method of claim 1 further comprising permitting said user to access said unknown media file stored in said repository to assist in identifying said metadata, by executing a program instruction in a data-processing system.

9. The method of claim 1 further comprising updating said unknown media file with said metadata from said repository, by executing a program instruction in a data-processing system.

10. A system, comprising:
a processor;
a data bus coupled to said processor; and
a computer-usable medium embodying computer code, said computer-usable medium being coupled to said data bus, said computer program code comprising instructions executable by said processor and configured for:
scanning an unknown media file to obtain a thirty second snippet of said unknown media file in response to a user request for identifying metadata associated with said unknown media file;
transmitting said thirty second snippet to a repository in order to thereafter search said repository based on said thirty second snippet wherein said repository comprises a plurality of indexed music tracks and metadata associated with each music track wherein said metadata comprises basic metadata and extended metadata, said extended metadata comprising cover art, performer biographies, reviews, related performers, where to buy similar items, upcoming concerts, ticket sales, URLs to other related experiences, and purchase opportunities;
comparing said thirty second snippet with a known media file in said repository to determine if said thirty second snippet matches said known media file;
crowdsourcing said unknown media file to aid in identifying the metadata associated with the unknown media file;
automatically retrieving a matching set of metadata with respect to a known media file stored in said repository if said thirty second snippet matches content associated with said known media file; and
storing said unknown media file in said repository, if said thirty second snippet associated with said unknown media file does not match content associated with said known media file, by executing a program instruction in a data-processing system.

11. The system of claim 10 wherein said instructions for retrieving a matching set of metadata with respect to a known media file are further configured for rating said unknown media file for accurate identification.

12. The system of claim 10 wherein said instructions are further configured for configuring a music recognition plug-in module wherein said music recognition plug-in module interacts with a host application embodied as said repository to process said unknown media file.

13. The system of claim 10 wherein said media file comprises a video clip.

14. The system of claim 10 wherein said instructions are further configured for permitting said user to access said unknown media file stored in said repository to assist in identifying said metadata.

15. The system of claim 10 wherein said instructions are further configured for updating said unknown media file with said metadata from said repository.

16. A system, comprising:
a processor;
a data bus coupled to said processor; and
a computer-usable medium embodying computer code, said computer-usable medium being coupled to said data bus, said computer program code comprising instructions executable by said processor and configured for:
scanning an unknown media file to obtain a thirty second snippet of said unknown media file in response to a user request for identifying metadata associated with said unknown media file;
transmitting said thirty second snippet to a repository in order to thereafter search said repository based on said thirty second snippet wherein said repository comprises a plurality of indexed music tracks and metadata associated with each music track wherein said metadata comprises basic metadata and extended metadata, said extended metadata comprising cover art, performer biographies, reviews, related performers, where to buy similar items, upcoming concerts, ticket sales, URLs to other related experiences, and purchase opportunities;
comparing said thirty second snippet with a known media file in said repository to determine if said thirty second snippet matches said known media file;
crowdsourcing said unknown media file to aid in identifying the metadata associated with the unknown media file; and
automatically retrieving a matching set of metadata with respect to a known media file stored in said repository if said thirty second snippet matches content associated with said known media file.

17. The system of claim 16 wherein said instructions are further configured for:
configuring a web interface in association with a socialized music server, by executing a program instruction in a data-processing system;
providing support tools associated with said web interface for increasing user effectiveness of providing information with respect to said unknown media file via said web interface; and populating said repository with said metadata with respect to said unknown media file via said web interface by said user, by executing a program instruction in a data-processing system.

18. The system of claim 16 wherein said instructions are further configured for:

providing a rating comprising a confidence level indicative of accurate music identifications provided by said user response to identify said metadata associated with said unknown media file in order to attract said user to contribute said unknown media file identification, by executing a program instruction in a data-processing system; and providing data communication between said repository and said web interface in order to populate said repository with said metadata, by executing a program instruction in a data-processing system.

* * * * *